(12) United States Patent
Ma

(10) Patent No.: US 11,757,474 B2
(45) Date of Patent: Sep. 12, 2023

(54) BASE STATION STATION-TYPE REPLACEMENT METHOD, SDR NETWORK MANAGEMENT SYSTEM, BASE STATION STATION-TYPE REPLACEMENT APPARATUS AND COMPUTER-READABLE STORAGE MEDIUM

(71) Applicant: ZTE Corporation, Shenzhen (CN)

(72) Inventor: Yanhong Ma, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/622,008

(22) PCT Filed: Aug. 27, 2020

(86) PCT No.: PCT/CN2020/111925
§ 371 (c)(1),
(2) Date: Dec. 22, 2021

(87) PCT Pub. No.: WO2021/037178
PCT Pub. Date: Mar. 4, 2021

(65) Prior Publication Data
US 2022/0271779 A1    Aug. 25, 2022

(30) Foreign Application Priority Data
Aug. 27, 2019    (CN) .......................... 201910794166.8

(51) Int. Cl.
*H04B 1/00*    (2006.01)
*H04L 41/12*    (2022.01)
*H04L 41/22*    (2022.01)

(52) U.S. Cl.
CPC ........... *H04B 1/0003* (2013.01); *H04L 41/12* (2013.01); *H04L 41/22* (2013.01)

(58) Field of Classification Search
CPC ..... H04L 41/12; H04L 41/22; H04L 41/0895; H04B 1/0003; H04W 24/02
See application file for complete search history.

(56) References Cited

U.S. PATENT DOCUMENTS

| | | | |
|---|---|---|---|
| 2010/0042989 A1* | 2/2010 | Anand | ................ H04L 41/145 717/176 |
| 2011/0161360 A1 | 6/2011 | Lundstrom | |
| 2019/0114057 A1 | 4/2019 | Kerr | |

FOREIGN PATENT DOCUMENTS

| | | |
|---|---|---|
| CN | 105227337 A | 1/2016 |
| CN | 105357023 A | 2/2016 |

(Continued)

OTHER PUBLICATIONS

Le, S. English translation of WO 2016/197953 A1. (Year: 2016).*

(Continued)

*Primary Examiner* — John M Macilwinen
(74) *Attorney, Agent, or Firm* — Vivacqua Crane, PLLC

(57) ABSTRACT

A base station type replacement method, a software defined radio (SDR) network management system, a base station type replacement apparatus and a non-transitory computer-readable storage medium are disclosed. The method may include: creating a blank target base station rack diagram in a view area in a source base station rack diagram according to a new base station creation operation of a user through an SDR network management system (201); and moving a graphical managed object (MO) in the source base station rack diagram to the target base station rack diagram according to a graphical move operation of the user, storing service location keyword information of the MO in the source base station rack diagram and the target base station rack diagram, and configuring data of a target base station based on (Continued)

Source station        Target station the target base station rack diagram during the graphical move operation to complete base station type replacement (202).

8 Claims, 6 Drawing Sheets

(56) References Cited

FOREIGN PATENT DOCUMENTS

| CN | 106487568 A | 3/2017 |
|---|---|---|
| EP | 2908198 A1 | 8/2015 |
| EP | 3185475 A1 | 6/2017 |
| WO | 2013058764 A1 | 4/2013 |

OTHER PUBLICATIONS

Trask, Bruce, et al. "Using model-driven engineering to complement software product line engineering in developing software defined radio components and applications." Companion to the 21st ACM SIGPLAN symposium on Object-oriented programming systems, languages, and applications. (Year: 2006).*

Ulversoy, Tore. "Software defined radio: Challenges and opportunities." IEEE Communications Surveys & Tutorials 12.4: 531-550. (Year: 2010).*

International Searching Authority. International Search Report and Written Opinion for PCT Application No. PCT/CN2020/111925 and English translation, dated Nov. 18, 2020, pp. 1-9.

European Patent Office. Extended European Search Report for EP Application No. 20856764.4, dated Sep. 8, 2022, pp. 1-9.

* cited by examiner

Rack diagram

Target station-before topology adjustment

Target station-after topology adjustment

BASE STATION STATION-TYPE REPLACEMENT METHOD, SDR NETWORK MANAGEMENT SYSTEM, BASE STATION STATION-TYPE REPLACEMENT APPARATUS AND COMPUTER-READABLE STORAGE MEDIUM

CROSS-REFERENCE TO RELATED APPLICATION

This application is a national stage filing under 35 U.S.C. § 371 of international application number PCT/CN2020/111925, filed Aug. 27, 2020, which claims priority to Chinese patent application No. 201910794166.8 filed on Aug. 27, 2019. The contents of these applications are incorporated herein by reference in their entirety.

TECHNICAL FIELD

Embodiments of the present disclosure relate to the communications field, and in particular, to a base station type replacement method, an SDR network management system, a base station type replacement apparatus and a non-transitory computer-readable storage medium.

BACKGROUND

An OMMB network management system supports management in operation and maintenance of multi-mode Software Defined Radio (SDR) base station products and devices. The system can help complete operations such as configuration of base station device parameters, status query and presentation, and performance alarming management. With the development of communications technologies, software and hardware capabilities of communication devices are constantly improved. Operators often upgrade devices to meet the needs of subsequent capacity expansion and service expansion. One of their common requirements is station type upgrade and replacement, which generally requires upgrading an old station type to a new type with stronger service capabilities. During station type upgrade and replacement, original hardware and networking modes remain unchanged to minimize an effect on original services and performance indicators. This requires that original configuration data remains unchanged as much as possible in the network management system.

For the requirement of keeping the original configuration data unchanged, an upgrade and replacement scheme, in some cases, is to create a new station type on the OMMB network management system and reconfigure data of a new station with reference to data of the original station. In a case of a small amount of work, it is usually done manually through data reallocation using a configuration operation management function provided by the network management system. However, the operation has the following obvious problems:

1: It is complex. In a reconfiguration process, there are many parameters requiring human attention to retain the networking mode of the original station type and optimized wireless parameters.

2: The effect is poor. It is difficult to maintain 100% of the optimized parameters. In addition, a higher degree of manual interaction means a higher error probability, which may cause performance indicators to fall after station replacement.

3: It is time-consuming. The workload comprises new station constitution and optimization, which may take a long time.

Therefore, there is a need for a scheme to resolve the above problems.

SUMMARY

An embodiment of the present disclosure provides a base station type replacement method, an SDR network management system, a base station type replacement apparatus, and a non-transitory computer-readable storage medium, to resolve related technical problems to a certain extent, comprising problems of complex base station type replacement, poor effect and time consumption.

An embodiment of the present disclosure provides a base station type replacement method, which may include: creating a blank target base station rack diagram in a view area in a source base station rack diagram according to a new base station creation operation of a user through a software defined radio (SDR) network management system; and moving a graphical managed object (MO) in the source base station rack diagram to the target base station rack diagram according to a graphical move operation of the user, storing service location keyword information of the MO in the source base station rack diagram and the target base station rack diagram, and configuring data of a target base station based on the target base station rack diagram during the graphical move operation to complete base station type replacement.

An embodiment of the present disclosure further provides an SDR network management system, which may include: a target base station rack diagram creation module, configured to create a blank target base station rack diagram in a view area in a source base station rack diagram according to a new base station creation operation of a user through a software defined radio (SDR) network management system; and a configuration and replacement module, configured to: move a graphical managed object (MO) in the source base station rack diagram to the target base station rack diagram according to a graphical move operation of the user, store service location keyword information of the MO in the source base station rack diagram and the target base station rack diagram, and configure data of a target base station based on the target base station rack diagram during the graphical move operation to complete base station type replacement.

An embodiment of the present disclosure further provides a base station type replacement apparatus, which may include: a memory, a processor, and a computer program stored in the memory and executable by the processor, where the computer program, when executed by the processor, causes the processor to perform the foregoing base station type replacement method.

An embodiment of the present disclosure further provides a non-transitory computer-readable storage medium storing a program for implementing information transmission, where the program, when executed by a processor, causes the processor to perform the foregoing base station type replacement method.

The aforementioned description is only an overview of the technical schemes of the present disclosure. In order to understand the technical measures of the present disclosure, the present disclosure can be implemented according to the contents of the description; and in order to make the aforementioned and other objects, features and advantages of the present disclosure more obvious and understandable, particular implementations are described below.

BRIEF DESCRIPTION OF DRAWINGS

Various other advantages and benefits will become clear to those having ordinary skills in the art after reading the following detailed description of several implementations. The drawings are only for the purpose of illustrating the several implementations and are not considered as a limitation of the present disclosure. Furthermore, the same reference numerals are used to denote the same parts throughout the drawings. In the accompanying drawings.

DETAILED DESCRIPTION

Figure 1:
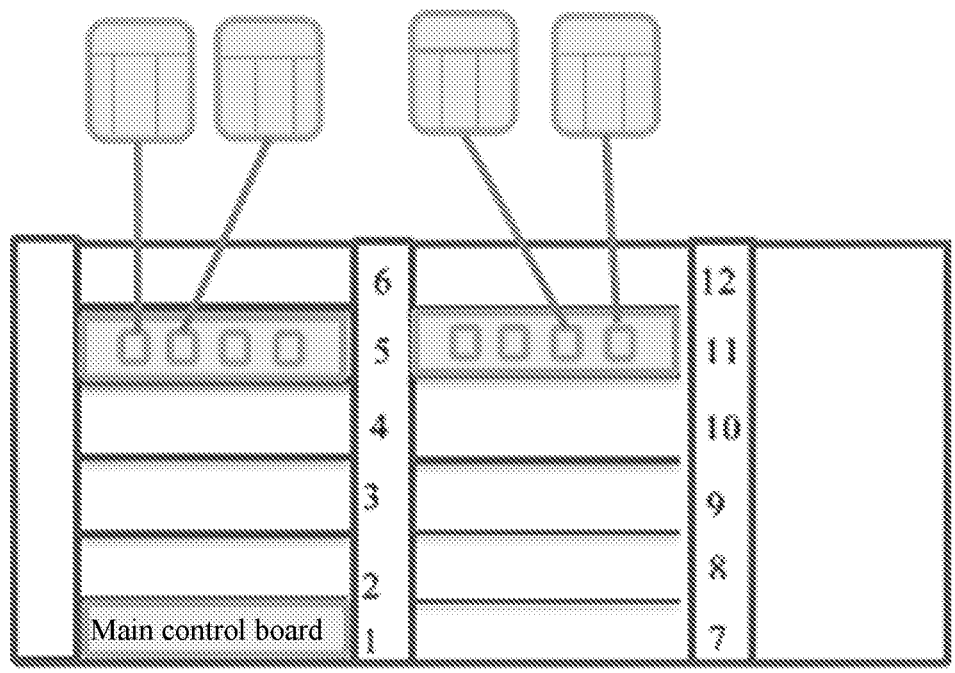
FIG. 1 is a schematic diagram of a rack diagram of a view area in an SDR system according to an embodiment of the present disclosure.

In view of related problems, on the basis of an SDR telecommunication network management system supporting MO modeling and rack diagram display, actions can be directly performed on a graphical MO on a rack diagram. After a series of combined actions, operations such as base station type replacement and networking deployment of hardware under the new station can be completed. According to the embodiments of the present disclosure, boards, topological link relationships between baseband boards and RRUs, transmission configuration, and all wireless configuration parameters of the original base station can be retained after a station type is replaced. In addition, the technical scheme of the embodiments of the present disclosure can adjust the topological link relationships between the baseband boards and the RRUs and adjust a visual presentation effect of an overall layout of the rack diagram by operating the graphical MO.

Example embodiments of the present disclosure are described in more detail below with reference to the accompanying drawings. Although example embodiments of the present disclosure are shown in the drawings, it should be understood that the present disclosure can be implemented in various forms and should not be limited by the embodiments set forth herein. On the contrary, the examples are provided for a more thorough understanding of the present disclosure, and can fully convey the scope of the present disclosure to those having ordinary skills in the art.

Before describing the embodiments of the present disclosure, SDR is first introduced in detail.

In a telecommunication network system, there are various resources to be managed, including physical resources such as a board, a Remote Radio Unit (RRU), and a transmission link. Logical resources such as a cell, a carrier frequency, and a protocol may be managed. The SDR network management system abstractly models the to-be-managed resources as Managed Objects (MO for short), and an MO instance represents a specific managed resource. The system supports use of Man-Machine Language (MML) commands for MO instantiation. The commands include creation, modification, deletion, and query of MO, and can be executed in batches.

In addition, the SDR network management system supports graphical display of the managed physical device resources. In other words, the system can present physical cabinets, chassis, slots, boards, and RRUs that constitute a base station, and physical relationships and topological connection relationships thereof in a form of rack diagrams in a system interface. FIG. 1 is a graphical display of various objects that are instantiated and modeled, including chassis (the chassis include board position information), main control boards, baseband boards, RRUs, optical fibers, ports and other object instances. Location information of the board on the chassis, the topological connection relationship between the RRU and the baseband board, and the like can be seen in FIG. 1.

METHOD EMBODIMENTS

Figure 2:
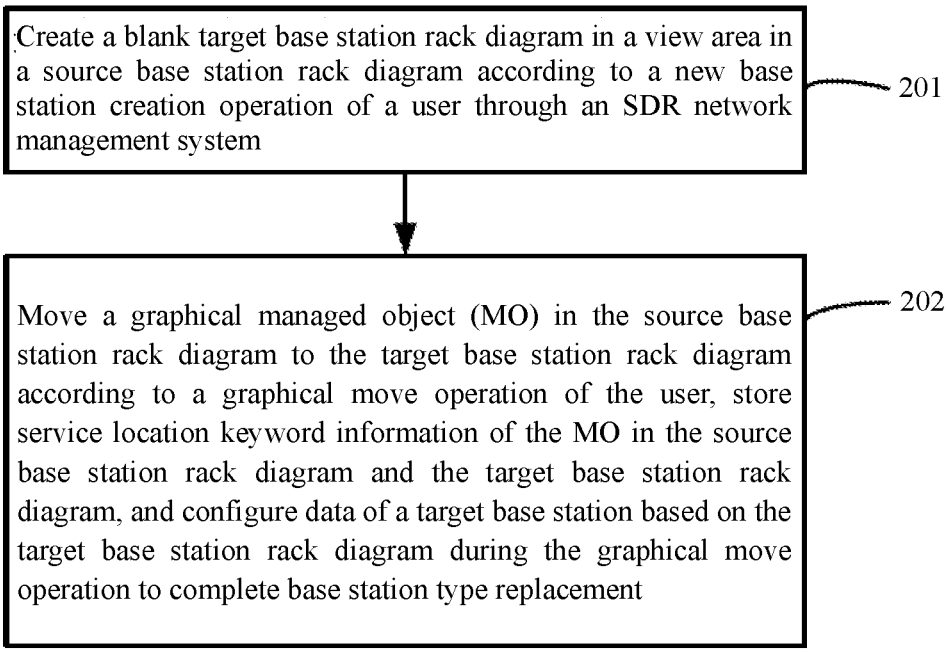
FIG. 2 is a flowchart of a base station type replacement method according to an embodiment of the present disclosure.

According to an embodiment of the present disclosure, a base station type replacement method is provided. FIG. 2 is a flowchart of the base station type replacement method according to the embodiment of the present disclosure. As shown in FIG. 2, the base station type replacement method according to the embodiment of the present disclosure specifically includes the following steps.

At step 201, a blank target base station rack diagram is created on a view area in a source base station rack diagram according to a new base station creation operation of a user through an SDR network management system.

That is, the embodiment of the present disclosure supports displaying two or more rack diagrams at the same time. On the basis of an existing rack diagram function, a graphical area supports simultaneous display of a plurality of base stations. To be specific, the original rack diagram and a rack diagram for replacement can be displayed simultaneously in the view area, and the rack diagram for replacement is an empty rack diagram without any board mounted.

At step 202, A graphical managed object MO in the source base station rack diagram is moved to the target base station rack diagram according to a graphical move operation of the user, service location keyword information of the MO in the source base station rack diagram and the target base station rack diagram is stored, and data of a target base station is configured based on the target base station rack diagram during the graphical move operation to complete base station type replacement. Here, in an embodiment of the present disclosure, the MO specifically includes: a board, a remote radio unit (RRU), a connection cable representing a topological connection relationship, and a sub-object under the board.

In other words, physical resources such as the board, the RRU, and an optical fiber on the rack diagram support accepting actions of the user. The actions of the user include but are not limited to the following operations: select, drag to move, and drop in an area. On the basis that the system supports the user's operation of graphics, the user can select the board in the rack diagram of a source base station, drag and move it to the rack diagram of the target base station, thus completing a cross-station migration operation of the board. In a process of moving the board, if there are cables connected on the board, the connected cables move with the board. After migrating the board, topological connections on the board migrate to the new base station with the board. Hardware networking after migration is presented in the new rack diagram. The system supports the user in selecting the RRU, and dragging and moving the RRU, to adjust a display position of the RRU in the rack diagram. The system supports dragging and extending the connection cable, and connecting or disconnecting endpoints of the connection cable with the RRU and the board.

For a cross-base station drag-and-move operation of the board, during the user's operation, the system records the service location keyword information of the board in the source rack diagram and the target rack diagram, that is, source (a rack number, a chassis number, and a slot number) and target (a rack number, a chassis number, and a slot number). The connection cable can change its length and connection position with the movement of the position of the board. The system records position information of the board connected by the connection cable in the source rack diagram and the target rack diagram, that is, source (a rack number, a chassis number, a slot number, and a port number) and target (a rack number, a chassis number, a slot number, and a port number).

In step 202, during base station type replacement, in one embodiment, the MO that affects a topological connection relationship in the source base station rack diagram is dragged to the target base station rack diagram according to the move operation of the user; and a new MO that does not affect the topological connection relationship or that is strongly related to a station type is created in the target base station rack diagram. Alternatively, in another embodiment, the MO can be directly dragged from the source base station rack diagram to the target base station rack diagram, and be modified as needed.

In addition, in step 202, a new set of MO instances are created for the target base station during the graphical move operation. In the MO instances, except that location information parameters of some MO instances and parameters of newly-created MO instances change, other MOs and other parameters retain the configuration data of the source base station. The data of the source base station is backed up and the source base station is deleted, and the MO instances are executed. Validity of the parameters is verified in the process of executing the MO instances. After the MO instances are executed, all the configuration data are replaced with data of the target base station, and base station type replacement is completed.

In addition, in the embodiment of the present disclosure, if a topology of the new base station may be changed, the following operation may be performed: changing the topological connection relationship in the target base station rack diagram according to a drag and extend operation of the user on the connection cable representing the topological connection relationship, and recording location information of the MO connected by the connection cable in the source base station rack diagram and the target base station rack diagram.

In other words, the system completes data configuration on the target base station in the process of graphical operation. For the system, one base station corresponds to one set of MO instances, and all resources of the source station are a set of MO instances with hierarchical relationships. This set of instances may be stored in the network management system in a form of files or database records, where racks and boards belong to high-level instances. A new set of MO instances are required for a target station type during station type replacement. Compared with the source base station, in the MO instances, except that the location information parameters of some MO instances change, other MOs and all parameters retain the configuration data of the source station. In the process of user operation, the system instantiates an object sequence of new station type according to MO instance information on the source base station and a result of the user's migration operation on the rack diagram. The instantiated sequence may be a set of MML command script files of the MO instances, or a system-defined file that meets a specific format, or a set of request commands supported by the system. The specific form can be flexibly determined depending on system support.

Through the above processing, the station type replacement and data configuration preparation on the target base station are completed. Then the system can use an existing process to deliver the prepared data to a network element to take effect, thus completing the entire data configuration operation after the station type replacement.

The above technical scheme of the embodiments of the present disclosure is described below in detail with reference to the accompanying drawings.

1. Station Type Replacement

Without changing the topological connection of the original base station, the process of station type replacement by using the embodiment of the present disclosure is as follows.

Figure 3:
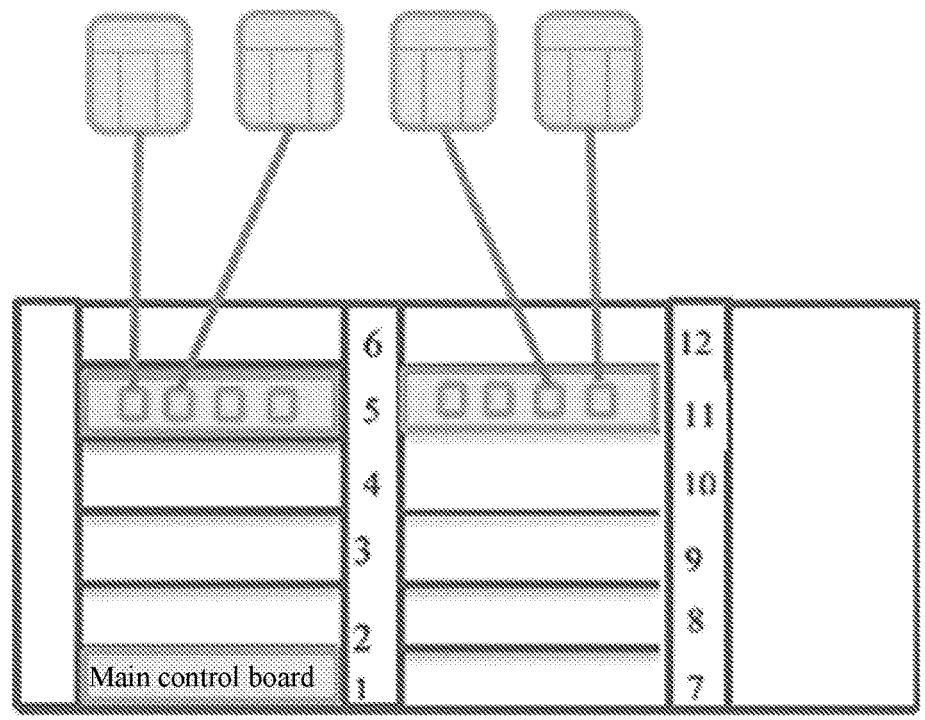
FIG. 3 is a schematic diagram of an initial state in a base station replacement process according to an embodiment of the present disclosure.
Figure 4:
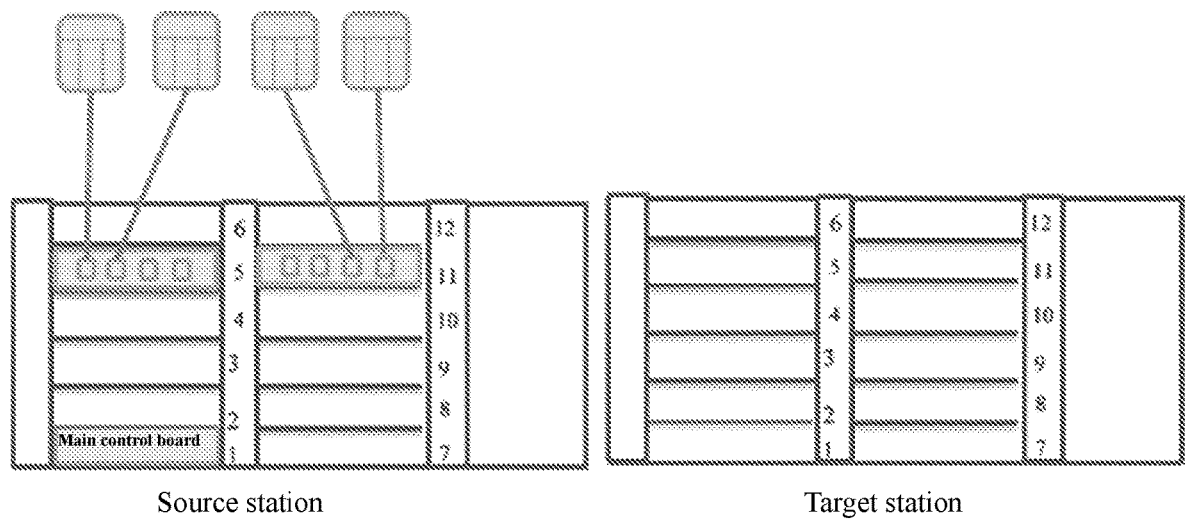
FIG. 4 is a rack diagram of a new target base station in a base station replacement process according to an embodiment of the present disclosure.

At step 1, an initial state is shown in FIG. 3. In the initial state, a related MO is instantiated according to a new base station creation operation of a user, a command to create a new base station, and a command to create information about a rack, a chassis and a slot of the new base station; and an instantiation result is presented in a same view area with a source base station in a form of a rack diagram, as shown in FIG. 4.

At step 2, the user may select a to-be-migrated board in a source rack diagram and drag the board to a planned position in a target rack diagram. The user can re-create boards such as a main control board and a power board on the target rack diagram because the boards do not affect a topological connection. In other words, the user changes the board's position by dragging the board, and completes migration from the source station to the target station.

Figure 5:
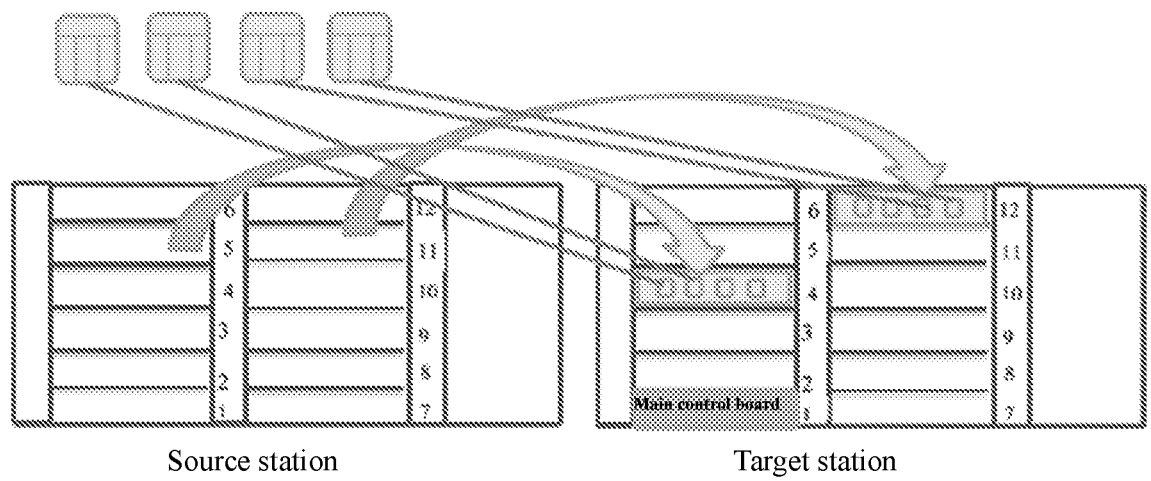
FIG. 5 is a schematic diagram of dragging MOs from a source base station rack diagram to a target base station rack diagram in a base station replacement process according to an embodiment of the present disclosure.

Topological connections may change or remain unchanged during migration. The main control board may be newly created or migrated from the source station. A migration status is shown in FIG. 5.

Based on the user's above operations, the system performs the following operations:

(1) For the migrated board, record a movement track of the board, that is, record source (a rack number, a chassis number and a slot number)→target (a rack number, a chassis number and a slot number).

(2) For a command to create a board object on the migrated board, (a target rack number, a target chassis number and a target slot number) are selected as keywords (rack number, chassis number and slot number), and other parameter values are the same as that of the source board.

(3) Complete migration of sub-objects under the migrated board, that is, a command to create sub-objects under the board. The number and attribute values of the sub-objects under the board are the same as those under the source board, and only location information keywords are replaced with (the target rack number, the target chassis number and the target slot number).

(4) Create commands for newly-created boards (such as a main control board, a power board and another board that does not affect the topological connection, or boards that are strongly related to the station type) and the sub-objects. The number of sub-objects, the parameter values and the location information keywords are determined according to needs of the new station type.

(5) According to transmission data under the source base station, create a creation command for the transmission data under the new station, where all attributes that are the same as (a source rack number, a source chassis number, and a source slot number) are replaced with (the target rack number, the target chassis number, and the target slot number).

(6) According to wireless data under the source base station, create a creation command for the wireless data under the new station, where all attributes that are related to (the source rack number, the source chassis number, and the source slot number) are replaced with (the target rack number, the target chassis number, and the target slot number).

Figure 6:
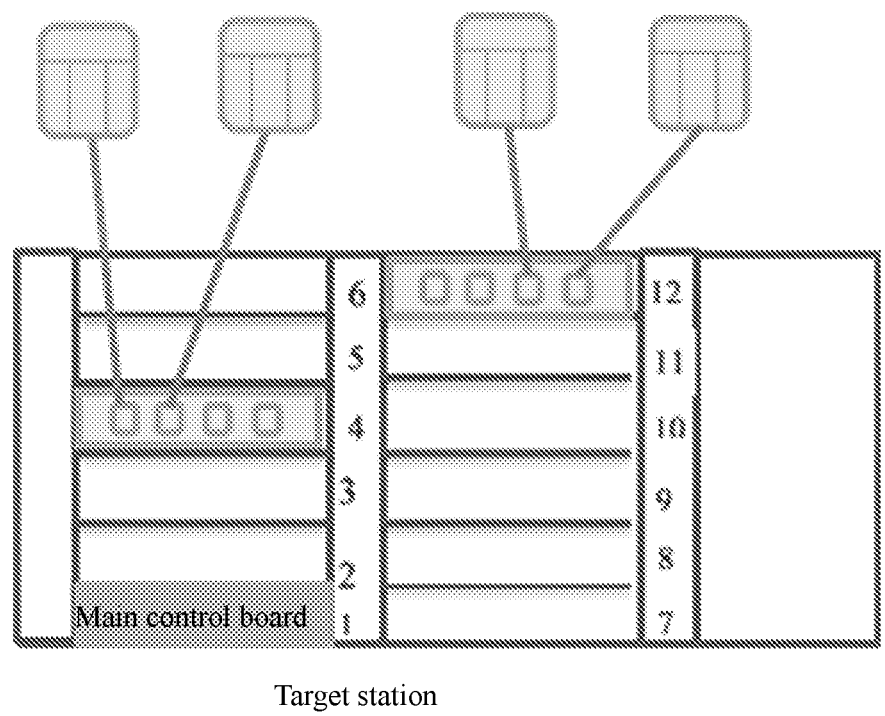
FIG. 6 is a schematic diagram of a target base station rack diagram in a base station replacement process according to an embodiment of the present disclosure.

After the above processing is completed, a complete instantiation command sequence of the target base station is buffered in the system. Because ID numbers of base stations in the telecommunication network management system are not allowed to be the same, the above commands cannot be immediately downloaded to the base station to take effect after creation. The system may back up data of the source station first, and then deliver a delete command to delete the source station. Then the system executes the command sequence created in the previous step in an order of instantiated MO objects. During execution of the command, network management performs validity check on the parameters to ensure that the generated data is valid. After the execution of the command, configuration data of the system is replaced with data of the new station type. The user can choose an appropriate time to deliver the new data to the network element to take effect. Before data delivery, it is necessary to physically replace a station type of an entity in an actual environment. A rack diagram of a final target base station is shown in FIG. 6.

Figure 7:
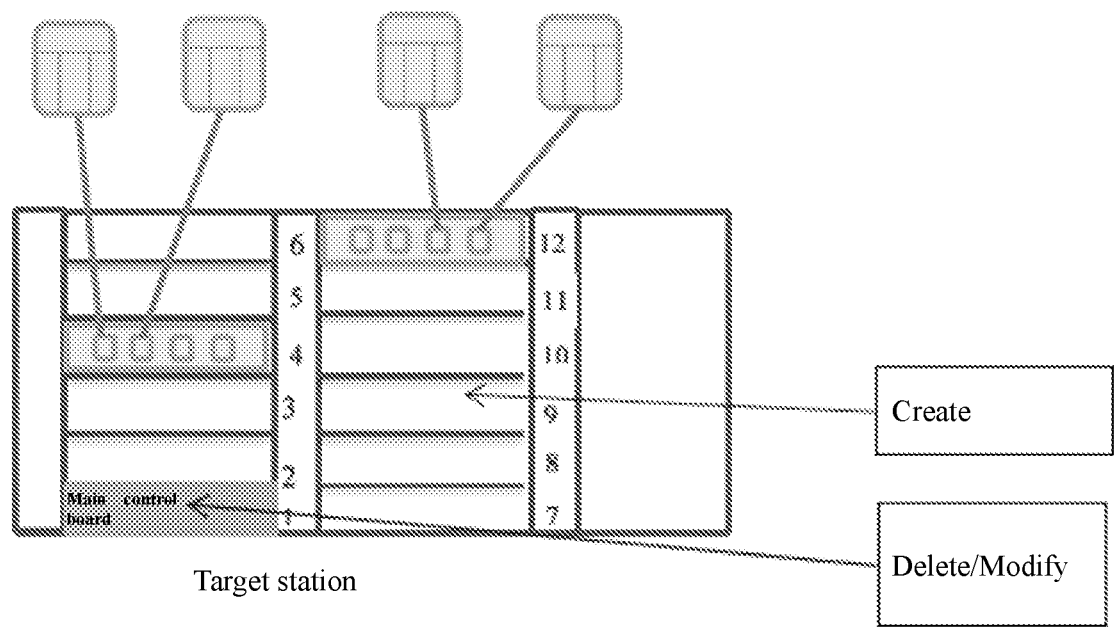
FIG. 7 is a schematic diagram of creating a new MO in a target base station rack diagram in a base station replacement process according to an embodiment of the present disclosure.

In the embodiment of the present disclosure, operations such as adding a board in the rack diagram are supported, for example, right-clicking the mouse on a corresponding slot to display the menu item "create a board". Right-clicking the mouse on an existing board can display the menu item "modify/delete". All management objects that can be displayed in the rack diagram can be directly created or deleted in the rack diagram. Therefore, in the process of station type replacement, a board that is strongly related to the new station type can be directly created in the target station rack diagram for use on the new station when necessary, as shown in FIG. 7.

In the above processing, a topological relationship may be adjusted, specifically as follows.

Figure 8:
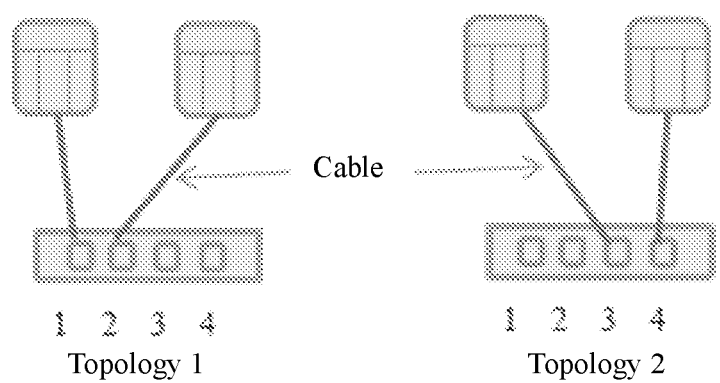
FIG. 8 is a schematic diagram of different topological relationships generated in a base station replacement process according to an embodiment of the present disclosure.

The topological relationship is a connection relationship between physical resources of entities. If frequent adjustment of the topological relationship is necessary in the process of station type replacement, the following scheme can be adopted:

1. As shown in FIG. 8, ports of the board are shown in the rack diagram, and the ports are arranged in a specific order. According to relative positions of the ports, attribute values of objects corresponding to the ports are determined. The topological relationship reflects two physical resources connecting through a specific port. For example, a connection between an RRU and a switchboard may have different topological relationships depending on different ports on the board to which the cable is connected.

Figure 9:
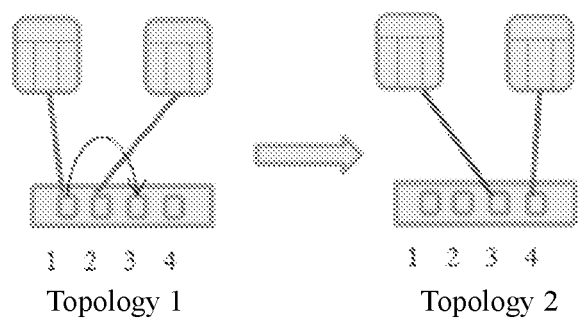
FIG. 9 is a schematic diagram of change in topological relationships in a base station replacement process according to an embodiment of the present disclosure.

2. Each physical entity in the rack diagram supports a drag operation. The cable can be visually changed in length and position by adjusting a position of an endpoint at either end of the cable, with a final position of the endpoint being a connection point. For example, if the lower endpoint of the cable in topology 1 in FIG. 8 is dragged from port 1 to port 3 on the baseband board, visual presentation of the cable changes. At the same time, the topological relationship between the RRU and the baseband board changes, as shown in FIG. 9.

3. Compared with station type replacement without changing the topological relationship, in station type replacement changing the topological relationship, location information keywords are changed from (a rack number, a chassis number, and a slot number) to (a rack number, a chassis number, a slot number, and a port number) on the basis of the above replacement scheme. In the process of MO instantiation, migration of source (the rack number, the chassis number, and the slot number) to target (the rack number, the chassis number, and the slot number) is changed to migration of source (the rack number, the chassis number, the slot number, and the port number) to target (the rack number, the chassis number, the slot number, and the port number) in the system.

Figure 10:
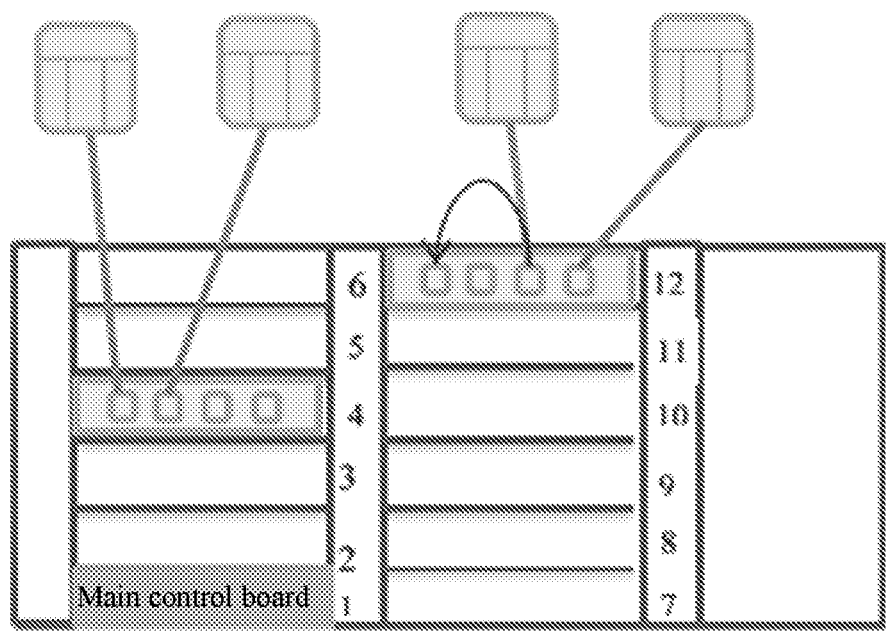
FIG. 10 is a schematic diagram of topological relationships in a target base station before adjustment in a base station replacement process according to an embodiment of the present disclosure.

4. As shown in FIG. 10, on the basis of completing the station type replacement without changing the topology, a connection relationship between one RRU and the baseband board is adjusted, and then of topology adjustment is completed.

Figure 11:
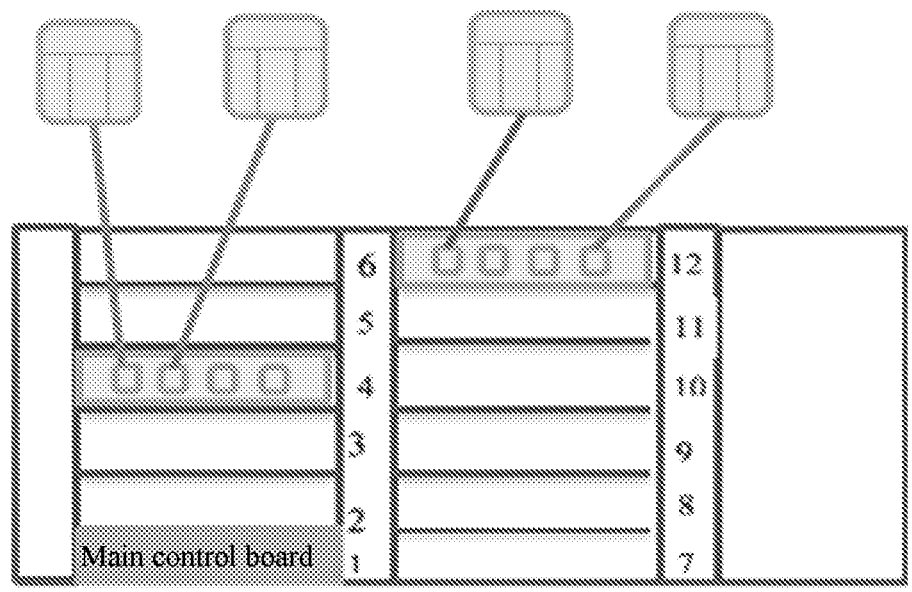
FIG. 11 is a schematic diagram of topological relationships in a target base station after adjustment in a base station replacement process according to an embodiment of the present disclosure.

5. After the adjustment, as shown in FIG. 11, positions of the cables in FIG. 11 have changed. According to the new topological relationship, the system generates a cable-related instantiation command sequence for the MO object. After the command is executed, the system completes the instantiation and creation process. The user can choose an appropriate time to deliver the instantiated data to the network element to take effect.

To sum up, with the help of the embodiments of the present disclosure, the problems of complexity, poor effect and time consumption in base station type replacement in some cases are solved, which makes the base station type replacement faster and more convenient, easier to operate, as well as safe and reliable.

Apparatus Embodiment I

Figure 12:
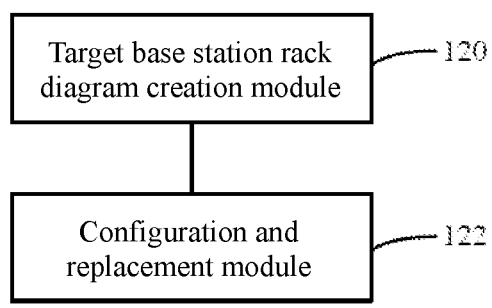
FIG. 12 is a schematic diagram of an SDR network management system according to an embodiment of the present disclosure.

According to an embodiment of the present disclosure, there is provided an SDR network management system. FIG. 12 is a schematic diagram of an SDR network management system according to an embodiment of the present disclosure, and the system specifically includes a target base station rack diagram creation module 120 and a configuration and replacement module 122.

The target base station rack diagram creation module 120 is configured to create a blank target base station rack diagram in a view area in a source base station rack diagram according to a new base station creation operation of a user through a software defined radio (SDR) network management system. That is, the target base station rack diagram creation module 120 supports displaying two or more rack diagrams at the same time. On the basis of an existing rack diagram function, a graphical area supports simultaneous display of a plurality of base stations. To be specific, the original rack diagram and a rack diagram for replacement can be displayed simultaneously in the view area, and the rack diagram for replacement is an empty rack diagram without any board mounted.

The configuration and replacement module 122 is configured to: move a graphical managed object (MO) in the source base station rack diagram to the target base station rack diagram according to a graphical move operation of the user, store service location keyword information of the MO in the source base station rack diagram and the target base station rack diagram, and configure data of a target base station based on the target base station rack diagram during the graphical move operation to complete base station type replacement. Here, in an embodiment of the present disclosure, the MO specifically includes: a board, a remote radio unit (RRU), a connection cable representing a topological connection relationship, and a sub-object under the board.

In other words, physical resources such as the board, the RRU, and an optical fiber on the rack diagram support accepting actions of the user. The actions of the user include but are not limited to the following operations: select, drag to move, and drop in an area. On the basis that the user's operation of graphics is supported, the user can select the board in the rack diagram of a source base station, drag and move it to the rack diagram of the target base station, thus completing a cross-station migration operation of the board. In a process of moving the board, if there are cables connected on the board, the connected cables move with the board. After migrating the board, topological connections on the board migrate to the new base station with the board. Hardware networking after migration is presented in the new rack diagram. The configuration and replacement module 122 supports the user in selecting the RRU, and dragging and moving the RRU, to adjust a display position of the RRU in the rack diagram. The system supports dragging and extending the connection cable, and connecting or disconnecting endpoints of the connection cable with the RRU and the board.

For a cross-base station drag-and-move operation of the board, during the user's operation, the configuration and replacement module 122 records the service location keyword information of the board in the source rack diagram and the target rack diagram, that is, source (a rack number, a chassis number, and a slot number) and target (a rack number, a chassis number, and a slot number). The connection cable can change its length and connection position with the movement of the position of the board. The system records position information of the board connected by the connection cable in the source rack diagram and the target rack diagram, that is, source (a rack number, a chassis number, a slot number, and a port number) and target (a rack number, a chassis number, a slot number, and a port number).

When the configuration and replacement module 122 performs base station type replacement, in one embodiment, the MO that affects a topological connection relationship in the source base station rack diagram is dragged to the target base station rack diagram according to the move operation of the user; and a new MO that does not affect the topological connection relationship or that is strongly related to a station type is created in the target base station rack diagram. Alternatively, in another embodiment, the MO can be directly dragged from the source base station rack diagram to the target base station rack diagram, and be modified as needed.

In addition, the configuration and replacement module 122 creates a new set of MO instances for the target base station during the graphical move operation. In the MO instances, except that location information parameters of some MO instances and parameters of newly-created MO instances change, other MOs and other parameters retain the configuration data of the source base station. The data of the source base station is backed up and the source base station is deleted, and the MO instances are executed. Validity of the parameters is verified in the process of executing the MO instances. After the MO instances are executed, all the configuration data are replaced with data of the target base station, and base station type replacement is completed.

In addition, in an embodiment of the present disclosure, if a topology of the new base station may be changed, the following operation may be performed: The configuration and replacement module 122 changes the topological connection relationship in the target base station rack diagram according to a drag and extend operation of the user on the connection cable representing the topological connection relationship, and records location information of the MO connected by the connection cable in the source base station rack diagram and the target base station rack diagram.

In other words, the configuration and replacement module 122 completes data configuration on the target base station in the process of graphical operation. For the configuration and replacement module 122, one base station corresponds to one set of MO instances, and all resources of the source station are a set of MO instances with hierarchical relationships. This set of instances may be stored in the network management system in a form of files or database records, where racks and boards belong to high-level instances. A new set of MO instances are required for a target station type during station type replacement. Compared with the source base station, in the MO instances, except that the location information parameters of some MO instances change, other MOs and all parameters retain the configuration data of the source station. In the process of user operation, the configuration and replacement module 122 instantiates an object sequence of new station type according to MO instance information on the source base station and a result of the user's migration operation on the rack diagram. The instantiated sequence may be a set of MML command script files of the MO instances, or a system-defined file that meets a specific format, or a set of request commands supported by the system. The specific form can be flexibly determined depending on system support.

Through the above processing, the station type replacement and data configuration preparation on the target base station are completed. Subsequently, the system uses an existing process to deliver the prepared data to a network element to take effect, thus completing the entire data configuration operation after the station type replacement.

Apparatus Embodiment II

Figure 13:
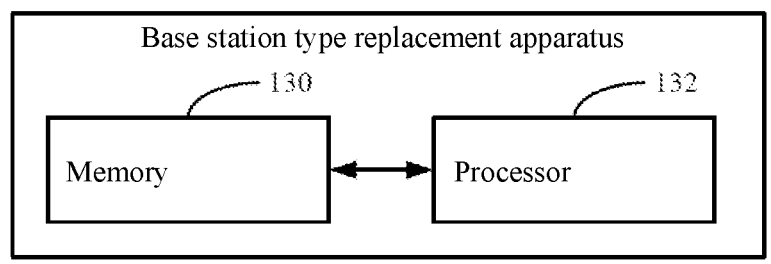
FIG. 13 is a schematic diagram of a base station type replacement apparatus according to an embodiment of the present disclosure.

An embodiment of the present disclosure provides a base station replacement apparatus, as shown in FIG. 13, including: a memory 130, a processor 132, and a computer program stored in the memory 130 and executable by the processor 132, where the computer program, when executed by the processor 132, causes the processor 132 to perform the following method.

At step 201, a blank target base station rack diagram is created on a view area in a source base station rack diagram according to a new base station creation operation of a user through an SDR network management system.

That is, the embodiment of the present disclosure supports displaying two or more rack diagrams at the same time. On the basis of an existing rack diagram function, a graphical area supports simultaneous display of a plurality of base stations. To be specific, the original rack diagram and a rack diagram for replacement can be displayed simultaneously in the view area, and the rack diagram for replacement is an empty rack diagram without any board mounted.

At step 202, moving a graphical managed object (MO) in the source base station rack diagram to the target base station rack diagram according to a graphical move operation of the user, storing service location keyword information of the MO in the source base station rack diagram and the target base station rack diagram, and configuring data of a target base station based on the target base station rack diagram during the graphical move operation to complete base station type replacement. Here, in an embodiment of the present disclosure, the MO specifically includes: a board, a remote radio unit (RRU), a connection cable representing a topological connection relationship, and a sub-object under the board.

In other words, physical resources such as the board, the RRU, and an optical fiber on the rack diagram support accepting actions of the user. The actions of the user include but are not limited to the following operations: select, drag to move, and drop in an area. On the basis that the system supports the user's operation of graphics, the user can select the board in the rack diagram of a source base station, drag and move it to the rack diagram of the target base station, thus completing a cross-station migration operation of the board. In a process of moving the board, if there are cables connected on the board, the connected cables move with the board. After migrating the board, topological connections on the board migrate to the new base station with the board. Hardware networking after migration is presented in the new rack diagram. The system supports the user in selecting the RRU, and dragging and moving the RRU, to adjust a display position of the RRU in the rack diagram. The system supports dragging and extending the connection cable, and connecting or disconnecting endpoints of the connection cable with the RRU and the board.

For a cross-base station drag-and-move operation of the board, during the user's operation, the system records the service location keyword information of the board in the source rack diagram and the target rack diagram, that is, source (a rack number, a chassis number, and a slot number) and target (a rack number, a chassis number, and a slot number). The connection cable can change its length and connection position with the movement of the position of the board. The system records position information of the board connected by the connection cable in the source rack diagram and the target rack diagram, that is, source (a rack number, a chassis number, a slot number, and a port number) and target (a rack number, a chassis number, a slot number, and a port number).

In step 202, during base station type replacement, in one embodiment, the MO that affects a topological connection relationship in the source base station rack diagram is dragged to the target base station rack diagram according to the move operation of the user; and a new MO that does not affect the topological connection relationship or that is strongly related to a station type is created in the target base station rack diagram. Alternatively, in another embodiment, the MO can be directly dragged from the source base station rack diagram to the target base station rack diagram, and be modified as needed.

In addition, in step 202, a new set of MO instances are created for the target base station during the graphical move operation. In the MO instances, except that location information parameters of some MO instances and parameters of newly-created MO instances change, other MOs and other parameters retain the configuration data of the source base station. The data of the source base station is backed up and the source base station is deleted, and the MO instances are executed. Validity of the parameters is verified in the process of executing the MO instances. After the MO instances are executed, all the configuration data are replaced with data of the target base station, and base station type replacement is completed.

In addition, in an embodiment of the present disclosure, if a topology of the new base station may be changed, the following operation may be performed: changing the topological connection relationship in the target base station rack diagram according to a drag and extend operation of the user on the connection cable representing the topological connection relationship, and recording location information of the MO connected by the connection cable in the source base station rack diagram and the target base station rack diagram.

In other words, the system completes data configuration on the target base station in the process of graphical operation. For the system, one base station corresponds to one set of MO instances, and all resources of the source station are a set of MO instances with hierarchical relationships. This set of instances may be stored in the network management system in a form of files or database records, where racks and boards belong to high-level instances. A new set of MO instances are required for a target station type during station type replacement. Compared with the source base station, in the MO instances, except that the location information parameters of some MO instances change, other MOs and all parameters retain the configuration data of the source station. In the process of user operation, the system instantiates an object sequence of new station type according to MO instance information on the source base station and a result of the user's migration operation on the rack diagram. The instantiated sequence may be a set of MML command script files of the MO instances, or a system-defined file that meets a specific format, or a set of request commands supported by the system. The specific form can be flexibly determined depending on system support.

Through the above processing, the station type replacement and data configuration preparation on the target base station are completed. Then the system can use an existing process to deliver the prepared data to a network element to take effect, thus completing the entire data configuration operation after the station type replacement.

The above technical scheme of the embodiments of the present disclosure is described below in detail with reference to the accompanying drawings.

1. Station Type Replacement

Without changing the topological connection of the original base station, the process of station type replacement by using the embodiment of the present disclosure is as follows.

At step 1, An initial state is shown in FIG. 3. In the initial state, a related MO is instantiated according to a new base station creation operation of a user, a command to create a new base station, and a command to create information about a rack, a chassis and a slot of the new base station; and an instantiation result is presented in a same view area with a source base station in a form of a rack diagram, as shown in FIG. 4.

At step 2, the user may select a to-be-migrated board in a source rack diagram and drag the board to a planned position in a target rack diagram. The user can re-create boards such as a main control board and a power board on the target rack diagram because the boards do not affect a topological connection. In other words, the user changes the board's position by dragging the board, and completes migration from the source station to the target station. Topological connections may change or remain unchanged during migration. The main control board may be newly created or migrated from the source station. A migration status is shown in FIG. 5.

Based on the user's above operations, the system performs the following operations:

(1) For the migrated board, record a movement track of the board, that is, record source (a rack number, a chassis number and a slot number)→target (a rack number, a chassis number and a slot number).

(2) For a command to create a board object on the migrated board, (a target rack number, a target chassis number and a target slot number) are selected as keywords (rack number, chassis number and slot number), and other parameter values are the same as that of the source board.

(3) Complete migration of sub-objects under the migrated board, that is, a command to create sub-objects under the board. The number and attribute values of the sub-objects under the board are the same as those under the source board, and only location information keywords are replaced with (the target rack number, the target chassis number and the target slot number).

(4) Create commands for newly-created boards (such as a main control board, a power board and another board that does not affect the topological connection, or boards that are strongly related to the station type) and the sub-objects. The number of sub-objects, the parameter values and the location information keywords are determined according to needs of the new station type.

(5) According to transmission data under the source base station, create a creation command for the transmission data under the new station, where all attributes that are the same as (a source rack number, a source chassis number, and a source slot number) are replaced with (the target rack number, the target chassis number, and the target slot number).

(6) According to wireless data under the source base station, create a creation command for the wireless data under the new station, where all attributes that are related to (the source rack number, the source chassis number, and the source slot number) are replaced with (the target rack number, the target chassis number, and the target slot number).

After the above processing is completed, a complete instantiation command sequence of the target base station is buffered in the system. Because ID numbers of base stations in the telecommunication network management system are not allowed to be the same, the above commands cannot be immediately downloaded to the base station to take effect after creation. The system may back up data of the source station first, and then deliver a delete command to delete the source station. Then the system executes the command sequence created in the previous step in an order of instantiated MO objects. During execution of the command, network management performs validity check on the parameters to ensure that the generated data is valid. After the execution of the command, configuration data of the system is replaced with data of the new station type. The user can choose an appropriate time to deliver the new data to the network element to take effect. Before data delivery, it is necessary to physically replace a station type of an entity in an actual environment. A rack diagram of a final target base station is shown in FIG. 6.

In an embodiment of the present disclosure, operations such as adding a board in the rack diagram are supported, for example, right-clicking the mouse on a corresponding slot to display the menu item "create a board". Right-clicking the mouse on an existing board can display the menu item "modify/delete". All management objects that can be displayed in the rack diagram can be directly created or deleted in the rack diagram. Therefore, in the process of station type replacement, a board that is strongly related to the new station type can be directly created in the target station rack diagram for use on the new station when necessary, as shown in FIG. 7.

In the above processing, a topological relationship may be adjusted. Specifically, The topological relationship is a connection relationship between physical resources of entities. If frequent adjustment of the topological relationship is necessary in the process of station type replacement, the following scheme can be adopted:

1. As shown in FIG. 8, ports of the board are shown in the rack diagram, and the ports are arranged in a specific order. According to relative positions of the ports, attribute values of objects corresponding to the ports are determined. The topological relationship reflects two physical resources connecting through a specific port. For example, a connection between an RRU and a switchboard may have different topological relationships depending on different ports on the board to which the cable is connected.

2. Each physical entity in the rack diagram supports a drag operation. The cable can be visually changed in length and position by adjusting a position of an endpoint at either end of the cable, with a final position of the endpoint being a connection point. For example, if the lower endpoint of the cable in topology 1 in FIG. 8 is dragged from port 1 to port 3 on the baseband board, visual presentation of the cable changes. At the same time, the topological relationship between the RRU and the baseband board changes, as shown in FIG. 9.

3. Compared with station type replacement without changing the topological relationship, in station type replacement changing the topological relationship, location information keywords are changed from (a rack number, a chassis number, and a slot number) to (a rack number, a chassis number, a slot number, and a port number) on the basis of the above replacement scheme. In the process of MO instantiation, migration of source (the rack number, the chassis number, and the slot number) to target (the rack number, the chassis number, and the slot number) is changed to migration of source (the rack number, the chassis number, the slot number, and the port number) to target (the rack number, the chassis number, the slot number, and the port number) in the system.

4. As shown in FIG. 10, on the basis of completing the station type replacement without changing the topology, a connection relationship between one RRU and the baseband board is adjusted, and then of topology adjustment is completed.

5. After the adjustment, as shown in FIG. 11, positions of the cables in FIG. 11 have changed. According to the new topological relationship, the system generates a cable-related instantiation command sequence for the MO object. After the command is executed, the system completes the instantiation and creation process. The user can choose an appropriate time to deliver the instantiated data to the network element to take effect.

Apparatus Embodiment III

An embodiment of the present disclosure provides a non-transitory computer-readable storage medium storing a program for implementing information transmission, where the program, when executed by the processor 132, causes the processor 132 to perform the following method.

At step 201, a blank target base station rack diagram is created on a view area in a source base station rack diagram according to a new base station creation operation of a user through an SDR network management system.

That is, the embodiment of the present disclosure supports displaying two or more rack diagrams at the same time. On the basis of an existing rack diagram function, a graphical area supports simultaneous display of a plurality of base stations. To be specific, the original rack diagram and a rack diagram for replacement can be displayed simultaneously in the view area, and the rack diagram for replacement is an empty rack diagram without any board mounted.

At step 202, a graphical managed object MO in the source base station rack diagram is dragged to the target base station rack diagram according to a graphical move operation of the user, service location keyword information of the MO in the source base station rack diagram and the target base station rack diagram is stored, and data of a target base station is configured based on the target base station rack diagram during the graphical move operation to complete base station type replacement. Here, in an embodiment of the present disclosure, the MO specifically includes: a board, a remote radio unit (RRU), a connection cable representing a topological connection relationship, and a sub-object under the board.

In other words, physical resources such as the board, the RRU, and an optical fiber on the rack diagram support accepting actions of the user. The actions of the user include but are not limited to the following operations: select, drag to move, and drop in an area. On the basis that the system supports the user's operation of graphics, the user can select the board in the rack diagram of a source base station, drag and move it to the rack diagram of the target base station, thus completing a cross-station migration operation of the board. In a process of moving the board, if there are cables connected on the board, the connected cables move with the board. After migrating the board, topological connections on the board migrate to the new base station with the board. Hardware networking after migration is presented in the new rack diagram. The system supports the user in selecting the RRU, and dragging and moving the RRU, to adjust a display position of the RRU in the rack diagram. The system supports dragging and extending the connection cable, and connecting or disconnecting endpoints of the connection cable with the RRU and the board.

For a cross-base station drag-and-move operation of the board, during the user's operation, the system records the service location keyword information of the board in the source rack diagram and the target rack diagram, that is, source (a rack number, a chassis number, and a slot number) and target (a rack number, a chassis number, and a slot number). The connection cable can change its length and connection position with the movement of the position of the board. The system records position information of the board connected by the connection cable in the source rack diagram and the target rack diagram, that is, source (a rack number, a chassis number, a slot number, and a port number) and target (a rack number, a chassis number, a slot number, and a port number).

In step 202, during base station type replacement, in one embodiment, the MO that affects a topological connection relationship in the source base station rack diagram is dragged to the target base station rack diagram according to the move operation of the user; and a new MO that does not affect the topological connection relationship or that is strongly related to a station type is created in the target base station rack diagram. Alternatively, in another embodiment, the MO can be directly dragged from the source base station rack diagram to the target base station rack diagram, and be modified as needed.

In addition, in step 202, a new set of MO instances are created for the target base station during the graphical move operation. In the MO instances, except that location information parameters of some MO instances and parameters of newly-created MO instances change, other MOs and other parameters retain the configuration data of the source base station. The data of the source base station is backed up and the source base station is deleted, and the MO instances are executed. Validity of the parameters is verified in the process of executing the MO instances. After the MO instances are executed, all the configuration data are replaced with data of the target base station, and base station type replacement is completed.

In addition, in an embodiment of the present disclosure, if a topology of the new base station may be changed, the following operation may be performed: changing the topological connection relationship in the target base station rack diagram according to a drag and extend operation of the user on the connection cable representing the topological connection relationship, and recording location information of the MO connected by the connection cable in the source base station rack diagram and the target base station rack diagram.

In other words, the system completes data configuration on the target base station in the process of graphical operation. For the system, one base station corresponds to one set of MO instances, and all resources of the source station are a set of MO instances with hierarchical relationships. This set of instances may be stored in the network management system in a form of files or database records, where racks and boards belong to high-level instances. A new set of MO instances are required for a target station type during station type replacement. Compared with the source base station, in the MO instances, except that the location information parameters of some MO instances change, other MOs and all parameters retain the configuration data of the source station. In the process of user operation, the system instantiates an object sequence of new station type according to MO instance information on the source base station and a result of the user's migration operation on the rack diagram. The instantiated sequence may be a set of MML command script files of the MO instances, or a system-defined file that meets a specific format, or a set of request commands supported by the system. The specific form can be flexibly determined depending on system support.

Through the above processing, the station type replacement and data configuration preparation on the target base station are completed. Then the system can use an existing process to deliver the prepared data to a network element to take effect, thus completing the entire data configuration operation after the station type replacement.

The above technical scheme of the embodiments of the present disclosure is described below in detail with reference to the accompanying drawings.

1. Station Type Replacement

Without changing the topological connection of the original base station, the process of station type replacement by using the embodiment of the present disclosure is as follows.

At step 1, An initial state is shown in FIG. 3. In the initial state, a related MO is instantiated according to a new base station creation operation of a user, a command to create a new base station, and a command to create information about a rack, a chassis and a slot of the new base station; and an instantiation result is presented in a same view area with a source base station in a form of a rack diagram, as shown in FIG. 4.

At step 2, the user may select a to-be-migrated board in a source rack diagram and drag the board to a planned position in a target rack diagram. The user can re-create boards such as a main control board and a power board on the target rack diagram because the boards do not affect a topological connection. In other words, the user changes the board's position by dragging the board, and completes migration from the source station to the target station. Topological connections may change or remain unchanged during migration. The main control board may be newly created or migrated from the source station. A migration status is shown in FIG. 5.

Based on the user's above operations, the system performs the following operations:

(1) For the migrated board, record a movement track of the board, that is, record source (a rack number, a chassis number and a slot number)→target (a rack number, a chassis number and a slot number).

(2) For a command to create a board object on the migrated board, (a target rack number, a target chassis number and a target slot number) are selected as keywords (rack number, chassis number and slot number), and other parameter values are the same as that of the source board.

(3) Complete migration of sub-objects under the migrated board, that is, a command to create sub-objects under the board. The number and attribute values of the sub-objects under the board are the same as those under the source board, and only location information keywords are replaced with (the target rack number, the target chassis number and the target slot number).

(4) Create commands for newly-created boards (such as a main control board, a power board and another board that does not affect the topological connection, or boards that are strongly related to the station type) and the sub-objects. The number of sub-objects, the parameter values and the location information keywords are determined according to needs of the new station type.

(5) According to transmission data under the source base station, create a creation command for the transmission data under the new station, where all attributes that are the same as (a source rack number, a source chassis number, and a source slot number) are replaced with (the target rack number, the target chassis number, and the target slot number).

(6) According to wireless data under the source base station, create a creation command for the wireless data under the new station, where all attributes that are related to (the source rack number, the source chassis number, and the source slot number) are replaced with (the target rack number, the target chassis number, and the target slot number).

After the above processing is completed, a complete instantiation command sequence of the target base station is buffered in the system. Because ID numbers of base stations in the telecommunication network management system are not allowed to be the same, the above commands cannot be immediately downloaded to the base station to take effect after creation. The system may back up data of the source station first, and then deliver a delete command to delete the source station. Then the system executes the command sequence created in the previous step in an order of instantiated MO objects. During execution of the command, network management performs validity check on the parameters to ensure that the generated data is valid. After the execution of the command, configuration data of the system is replaced with data of the new station type. The user can choose an appropriate time to deliver the new data to the network element to take effect. Before data delivery, it is necessary to physically replace a station type of an entity in an actual environment. A rack diagram of a final target base station is shown in FIG. 6.

In an embodiment of the present disclosure, operations such as adding a board in the rack diagram are supported, for example, right-clicking the mouse on a corresponding slot to display the menu item "create a board". Right-clicking the mouse on an existing board can display the menu item "modify/delete". All management objects that can be displayed in the rack diagram can be directly created or deleted in the rack diagram. Therefore, in the process of station type replacement, a board that is strongly related to the new station type can be directly created in the target station rack diagram for use on the new station when necessary, as shown in FIG. 7.

In the above processing, a topological relationship may be adjusted. Specifically, The topological relationship is a connection relationship between physical resources of entities. If frequent adjustment of the topological relationship is necessary in the process of station type replacement, the following scheme can be adopted:

1. As shown in FIG. 8, ports of the board are shown in the rack diagram, and the ports are arranged in a specific order. According to relative positions of the ports, attribute values of objects corresponding to the ports are determined. The topological relationship reflects two physical resources connecting through a specific port. For example, a connection between an RRU and a switchboard may have different topological relationships depending on different ports on the board to which the cable is connected.

2. Each physical entity in the rack diagram supports a drag operation. The cable can be visually changed in length and position by adjusting a position of an endpoint at either end of the cable, with a final position of the endpoint being a connection point. For example, if the lower endpoint of the cable in topology 1 in FIG. 8 is dragged from port 1 to port 3 on the baseband board, visual presentation of the cable changes. At the same time, the topological relationship between the RRU and the baseband board changes, as shown in FIG. 9.

3. Compared with station type replacement without changing the topological relationship, in station type replacement changing the topological relationship, location information keywords are changed from (a rack number, a chassis number, and a slot number) to (a rack number, a chassis number, a slot number, and a port number) on the basis of the above replacement scheme. In the process of MO instantiation, migration of source (the rack number, the chassis number, and the slot number) to target (the rack number, the chassis number, and the slot number) is changed to migration of source (the rack number, the chassis number, the slot number, and the port number) to target (the rack number, the chassis number, the slot number, and the port number) in the system.

4. As shown in FIG. 10, on the basis of completing the station type replacement without changing the topology, a connection relationship between one RRU and the baseband board is adjusted, and then of topology adjustment is completed.

5. After the adjustment, as shown in FIG. 11, positions of the cables in FIG. 11 have changed. According to the new topological relationship, the system generates a cable-related instantiation command sequence for the MO object. After the command is executed, the system completes the instantiation and creation process. The user can choose an appropriate time to deliver the instantiated data to the network element to take effect.

The computer-readable storage medium described in this embodiment includes, but is not limited to: a ROM, a RAM, a magnetic disk or an optical disk, etc.

Through the embodiments of the present disclosure, the problems of complexity, poor effect and time consumption in base station type replacement in some cases are solved, which makes the base station type replacement faster and more convenient, easier to operate, as well as safe and reliable.

Obviously, those having ordinary skills in the art should understand that the above modules or steps of the embodiments of the present disclosure may be implemented by a general-purpose computing device and may be concentrated in one single computing device or distributed in a network composed of a plurality of computing devices, and in some embodiments, may be implemented by program codes executable by a computing device, so that they can be stored in a storage device and executed by the computing device. Moreover, in some cases, the steps shown or described herein can be performed in a different order, or they can be made into individual integrated circuit modules, or a plurality of the modules or steps can be made into one single integrated circuit module. Therefore, the present disclosure is not limited to any particular combination of hardware and software.

The above is only the description of several embodiments of the present disclosure, and is not intended to limit the present disclosure. It will be apparent to those having ordinary skills in the art that various modifications and variations can be made to the present disclosure. Any modifications, equivalent substitutions, improvements, etc. made within the scope and principle of the present disclosure shall fall within the scope of protection of the present disclosure.

The invention claimed is:

1. A base station type replacement method, comprising:
creating a blank target base station rack diagram in a view area in a source base station rack diagram according to a new base station creation operation of a user through a software defined radio (SDR) network management system; and
moving a graphical managed object (MO) in the source base station rack diagram to the target base station rack diagram according to a graphical move operation of the user, storing service location keyword information of the MO in the source base station rack diagram and the target base station rack diagram, and configuring data of a target base station based on the target base station rack diagram during the graphical move operation to complete base station type replacement;
wherein the MO comprises: a board, a remote radio unit (RRU), a connection cable representing a topological connection relationship, and a sub-object under the board;
further comprising:
changing the topological connection relationship in the target base station rack diagram according to a drag and extend operation of the user on the connection cable representing the topological connection relationship, and recording location information of the MO connected by the connection cable in the source base station rack diagram and the target base station rack diagram.

2. The method of claim 1, wherein moving a graphical managed object (MO) in the source base station rack diagram to the target base station rack diagram according to a graphical move operation of the user comprises:
dragging the MO which affects a topological connection relationship in the source base station rack diagram to the target base station rack diagram according to the move operation of the user; and
the method further comprises:
creating a new MO which does not affect the topological connection relationship or a new MO which is related to a station type, in the target base station rack diagram.

3. The method of claim 1, wherein configuring data of a target base station based on the target base station rack diagram during the graphical move operation comprises:
creating a new set of MO instances for the target base station during the graphical move operation, wherein in the MO instances, except that location information parameters of some MO instances and parameters of newly-created MO instances change, the configuration data of a source base station is retained for other MOs and other parameters; and
backing up the data of the source base station and deleting the source base station, executing the MO instances, and verifying validity of the parameters in the process of executing the MO instances, wherein after the MO instances are executed, all the configuration data are replaced with the data of the target base station, to complete the base station type replacement.

4. A software defined radio (SDR) network management system, comprising:
a target base station rack diagram creation circuit, configured to create a blank target base station rack diagram in a view area in a source base station rack diagram according to a new base station creation operation of a user through an SDR network management system; and
a configuration and replacement circuit, configured to:
move a graphical managed object (MO) in the source base station rack diagram to the target base station rack diagram according to a graphical move operation of the user, store service location keyword information of the MO in the source base station rack diagram and the target base station rack diagram, and configure data of a target base station based on the target base station rack diagram during the graphical move operation to complete base station type replacement;

wherein the MO comprises: a board, a remote radio unit (RRU), a connection cable representing a topological connection relationship, and a sub-object under the board;

wherein the configuration and replacement circuit is further configured to:

change the topological connection relationship in the target base station rack diagram according to a drag and extend operation of the user on the connection cable representing the topological connection relationship, and record location information of the MO connected by the connection cable in the source base station rack diagram and the target base station rack diagram.

5. The system of claim 4, wherein the configuration and replacement circuit is configured to:

drag the MO which affects a topological connection relationship in the source base station rack diagram to the target base station rack diagram according to the move operation of the user; and the configuration and replacement circuit is further configured to:

create a new MO which does not affect the topological connection relationship or a new MO which is related to a station type in the target base station rack diagram.

6. The system of claim 4, wherein the configuration and replacement circuit is configured to:

create a new set of MO instances for the target base station during the graphical move operation, wherein in the MO instances, except that location information parameters of some MO instances and parameters of newly-created MO instances change, the configuration data of a source base station is retained for other MOs and other parameters; and back up the data of the source base station and delete the source base station, execute the MO instances, and verify validity of the parameters in the process of executing the MO instances, wherein after the MO instances are executed, all the configuration data are replaced with the data of the target base station, to complete the base station type replacement.

7. A base station type replacement apparatus, comprising: a memory, a processor, and a computer program stored in the memory and executable by the processor, wherein the computer program, when executed by the processor, causes the processor to perform a base station type replacement method, comprising:

creating a blank target base station rack diagram in a view area in a source base station rack diagram according to a new base station creation operation of a user through a software defined radio (SDR) network management system; and moving a graphical managed object (MO) in the source base station rack diagram to the target base station rack diagram according to a graphical move operation of the user, storing service location keyword information of the MO in the source base station rack diagram and the target base station rack diagram, and configuring data of a target base station based on the target base station rack diagram during the graphical move operation to complete base station type replacement;

wherein the MO comprises: a board, a remote radio unit (RRU), a connection cable representing a topological connection relationship, and a sub-object under the board;

further comprising:

changing the topological connection relationship in the target base station rack diagram according to a drag and extend operation of the user on the connection cable representing the topological connection relationship, and recording location information of the MO connected by the connection cable in the source base station rack diagram and the target base station rack diagram.

8. A non-transitory computer-readable storage medium, storing a program for implementing information transmission, wherein the program, when executed by a processor, causes the processor to perform a base station type replacement method, comprising:

creating a blank target base station rack diagram in a view area in a source base station rack diagram according to a new base station creation operation of a user through a software defined radio (SDR) network management system; and moving a graphical managed object (MO) in the source base station rack diagram to the target base station rack diagram according to a graphical move operation of the user, storing service location keyword information of the MO in the source base station rack diagram and the target base station rack diagram, and configuring data of a target base station based on the target base station rack diagram during the graphical move operation to complete base station type replacement;

wherein the MO comprises: a board, a remote radio unit (RRU), a connection cable representing a topological connection relationship, and a sub-object under the board;

further comprising:

changing the topological connection relationship in the target base station rack diagram according to a drag and extend operation of the user on the connection cable representing the topological connection relationship, and recording location information of the MO connected by the connection cable in the source base station rack diagram and the target base station rack diagram.

* * * * *